United States Patent
Vince et al.

(10) Patent No.: US 8,687,806 B2
(45) Date of Patent: Apr. 1, 2014

(54) CONDITIONAL ACCESS SYSTEM EMPLOYING CONSTRAINED ENCRYPTION KEYS

(75) Inventors: Lawrence D. Vince, Lansdale, PA (US); Eric J. Sprunk, Carlsbad, CA (US)

(73) Assignee: Motorola Mobility LLC, Libertyville, IL (US)

( * ) Notice: Subject to any disclaimer, the term of this patent is extended or adjusted under 35 U.S.C. 154(b) by 1014 days.

(21) Appl. No.: 12/345,741

(22) Filed: Dec. 30, 2008

(65) Prior Publication Data

US 2009/0202075 A1 Aug. 13, 2009

Related U.S. Application Data

(60) Provisional application No. 61/026,877, filed on Feb. 7, 2008.

(51) Int. Cl.
*H04L 9/00* (2006.01)
*H04L 9/08* (2006.01)
*G06F 7/04* (2006.01)
*G06F 17/30* (2006.01)

(52) U.S. Cl.
USPC .............. 380/44; 380/278; 380/46; 713/150; 713/189; 726/26; 726/27; 726/29

(58) Field of Classification Search
USPC ........................ 713/156, 163; 380/255, 268
See application file for complete search history.

(56) References Cited

U.S. PATENT DOCUMENTS

| | | | | |
|---|---|---|---|---|
| 5,425,103 | A * | 6/1995 | Shaw | 380/44 |
| 7,434,065 | B2 * | 10/2008 | Rodgers et al. | 713/189 |
| 7,797,551 | B2 * | 9/2010 | Rodgers et al. | 713/189 |
| 2003/0005435 | A1 * | 1/2003 | Nelger et al. | 725/31 |
| 2003/0091188 | A1 * | 5/2003 | Patinkin et al. | 380/210 |
| 2005/0105732 | A1 * | 5/2005 | Hutchings et al. | 380/255 |
| 2005/0238170 | A1 * | 10/2005 | Ksontini et al. | 380/268 |

* cited by examiner

*Primary Examiner* — Tae Kim

(57) ABSTRACT

A method and apparatus is provided for decrypting an encrypted transport stream, comprising. The method includes receiving the encrypted transport stream over a content delivery network. The encrypted transport stream is encrypted using a first control word that serves as an encryption/decryption key. A variable control word is received over the content delivery network. The variable control word is mathematically constrained to create a second control word. The encrypted transport stream is decrypted using the second control word if the second control word is the same as the first control word.

21 Claims, 4 Drawing Sheets

CONDITIONAL ACCESS SYSTEM EMPLOYING CONSTRAINED ENCRYPTION KEYS

STATEMENT OF RELATED APPLICATIONS

This application claims the benefit of U.S. Provisional Patent Application Ser. No. 61/026,877, filed Feb. 7, 2008 and entitled "A Method For Constraining Encrypting Keys To Prevent Brute Force Attacks On A System," which is incorporated by reference herein in its entirety.

FIELD OF THE INVENTION

The present invention relates generally to broadcast or other content delivery system systems such as a CATV system, and more particularly to a conditional access system employed in a content delivery system.

BACKGROUND OF THE INVENTION

Information broadcast systems include subscription-based systems in which a user subscribes to a broadcast system that provides programming or other content to the subscriber through a cable network or a satellite dish, for example. Since the programming is broadcast, it is transmitted once for receipt by all eligible receivers. Access to the data, however, is conditional, depending, for example, on whether or not a subscription fee has been paid for a specific receiver. Such conditional access to the content is realized by encrypting the information (usually the encryption occurs in the transmitter) under control of an authorization key and by transmitting the encrypted content to the receivers. Furthermore, the decryption keys necessary for the decryption of the content are encrypted themselves and transmitted to the receivers. Often, symmetrical encryption techniques are used, where the encryption and decryption keys are the same. Only those receivers that are entitled to the content are able to decrypt the decryption key using a first decryptor. The receivers can then decrypt the content using a second decryptor for decrypting the content under control of the authorization key.

Conditional access is provided by conditional access (CA) systems that come as matched sets—one part is integrated into the cable system headend (in a cable broadcast system) and encrypts premium content, the other part provides decryption and is built into the set-top boxes installed in user's homes. Several CA systems are used in the cable industry, including those provided by vendors such as Motorola (Schaumberg, Ill.), Scientific Atlanta (Atlanta, Ga.) and NDS (Staines, U.K.). Typically, the decryption mechanism is a dedicated encryption engine, e.g., an integrated circuit (IC) chip or dedicated hardware specifically designed to perform the decryption function. One example of a chip with this type of decryption capability is Motorola's MC 1.7 (MediaCipher v1.7) Conditional Access Control chip. All the decryption keys and the decryption functions are protected on this chip.

CA vendors generally allow limited access to the decryption engine in order to protect the decryption keys and the decryption functions. For this reason the CA vendors often tightly control the chip-making process and writing their own firmware, software, and the like. However, in order to reduce costs and increase the flexibility to outsource various parts of the chip-making process, it would be desirable to use more standardized chip-making processes in which such tight controls are unavailable, thereby making the decryption engine less secure. As a result, decryption engines manufactured in this manner are less secure and the CA systems in which they are employed are more vulnerable to attack from hackers and the like.

Decryption engines of the type described above that operate in a less secure environment would ideally be backward compatible with conventional decryption engines that operate in a more secure environment. That is, both types of decryption engines preferably should be operable in the same CA system. However, in order to maintain security, this requires that the decryption engines that operate in the less secure environment should not be able to attack those decryption engines operating in the more secure environment. That is, the decryption engines operating in the less secure environment should not be able to decrypt encrypted content that is intended to be decrypted by a decryption engine operating in the more secure environment.

SUMMARY

In accordance with the present invention, a method and apparatus is provided for decrypting an encrypted transport stream, comprising. The method includes receiving the encrypted transport stream over a content delivery network. The encrypted transport stream is encrypted using a first control word that serves as an encryption/decryption key. A variable control word is received over the content delivery network. The variable control word is mathematically constrained to create a second control word. The encrypted transport stream is decrypted using the second control word if the second control word is the same as the first control word.

In accordance with another aspect of the invention, a client device is provided that includes a receiver for receiving and demodulating an encrypted transport stream over a content distribution network. The encrypted transport stream is encrypted using a first control word that serves as an encryption/decryption key. The client device also includes a decryptor for decrypting the encrypted transport steam using a second control word. The decryptor is configured to derive the second control word in part using an algorithm that is locally accessible to the decryptor. A decoder is provided for decoding the decrypted transport stream.

DETAILED DESCRIPTION

Figure 1:
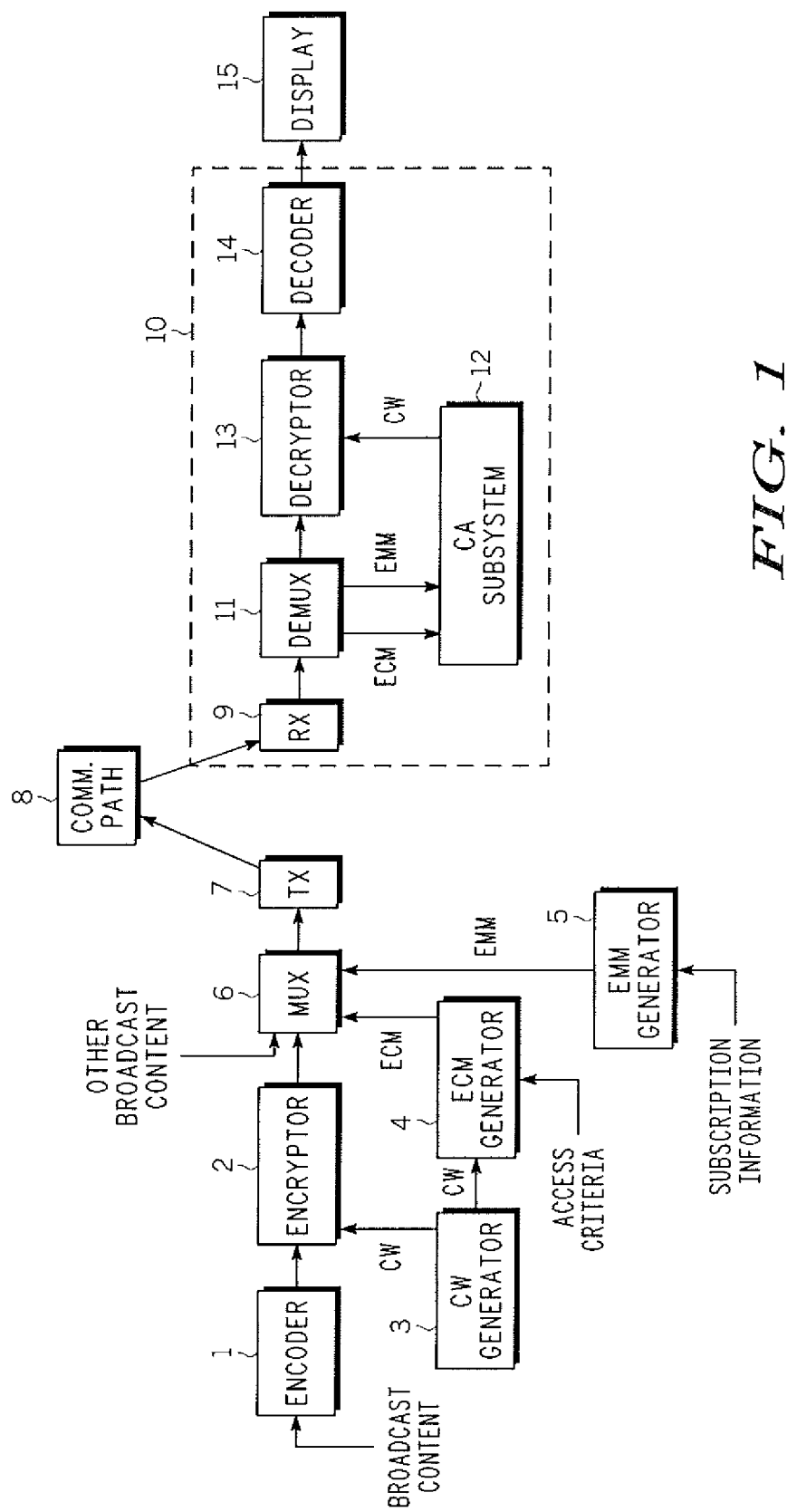
FIG. 1 shows a system for securely distributing content to client devices in accordance with an embodiment of the invention.

FIG. 1 shows a system for distributing content securely in accordance with an embodiment of the invention. Content to be broadcast, including for example, video, audio and data components, is encoded in an encoder 1 using an appropriate coding system, for example MPEG-II for digital broadcasting. The encoded broadcast stream is encrypted or scrambled in an encryptor 2 under the control of a set of control words CW generated by a control word generator 3 in a manner which is well-known per se. Each control word CW is an encrypted key that is required to both encrypt and decrypt the encoded broadcast stream. Each control word is incorporated into an Entitlement Control Message (ECM) by an ECM generator 4 together with access criteria that identify the service and the conditions required to access the service. For example, the access criteria may specify regional limitations on the broadcast. Alternatively, the ECM generator may generate the control words directly. A further type of message, referred to as an Entitlement Management Message (EMM), which carries details of the subscriber and his or her subscription is generated by an EMM generator 5. While an ECM message is associated with an encrypted program or a set of programs and carries the information required to decrypt those programs, an EMM message is a message dedicated to an individual user or group of users and carries the information necessary to determine whether those users have the necessary subscriptions in place to be able to view the program.

The encrypted and encoded broadcast stream, together with the ECM and EMM messages, is multiplexed in a multiplexer 6 with other broadcast streams representing other programs, together making up a multi-program transport stream (MPTS). The MPTS is sent to a transmitter 7 from which it is transmitted, via a communications path 8, for example a content delivery system such as a satellite or cable system, using an appropriate modulation scheme. The modulated MPTS is received by a client device such as a subscriber's set-top box 10.

On receipt at a set-top box 10 by a receiver 9, the received signal is demodulated and the MPTS data is demultiplexed in a demultiplexer 11 to extract the required program and its associated ECM and EMM messages. The extracted ECM and EMM messages are sent to a CA subsystem 12. The CA subsystem 12 uses the ECM and EMM messages to determine whether the subscriber has the right to view the broadcast and if so, to reproduce the control words CW, which are input to a decryptor 13 together with the encrypted broadcast stream to recover the original MPEG-II encoded broadcast stream. The encoded stream is passed to an MPEG-II decoder 14, which produces an output signal comprising audio, video and data components for display and use at the subscriber's television 15.

Each control word is generally a random number that serves as an encrypted key. The control word is typically changed at predetermined intervals. A continuous stream of ECM messages is therefore required to decrypt the encrypted signal. The EMM message is updated far less frequently than the ECM messages. Support for the carriage of ECM and EMM messages is defined in the international standard ISO IEC 13818-1.

It will be understood that the function of the various components of the conditional access system, including client device 10, shown in FIG. 1 may be carried out using hardware, software, firmware, or any combination thereof. That is, the particular functional elements set forth in FIG. 1 are shown for purposes of clarity only and do not necessarily correspond to discrete physical elements.

As previously mentioned, if the decryptors 13 in some client devices 10 are less secure than the decryptors 13 in other client devices 10, those less secure decryptors 13 could be used to attack the client devices 10 that incorporate the more secure decryptors 13. This could be accomplished, for example, by gaining access to the control word that is sent to the client devices 10 that employ the less secure decryptors 13 via the EMM and ECM messages. This problem can be overcome by constraining or restricting the less secure decryptors so that they only employ a limited number of the total set of control words that may be employed by the more secure decryptors 13. If the limited number of control words that are employed by the constrained decryptor (which is less secure) are a relatively small subset of the control words that are employed by the unconstrained decryptor (which is more secure), then it becomes unlikely that the constrained decryptor could be used to attack the unconstrained encryptor.

Figure 2:
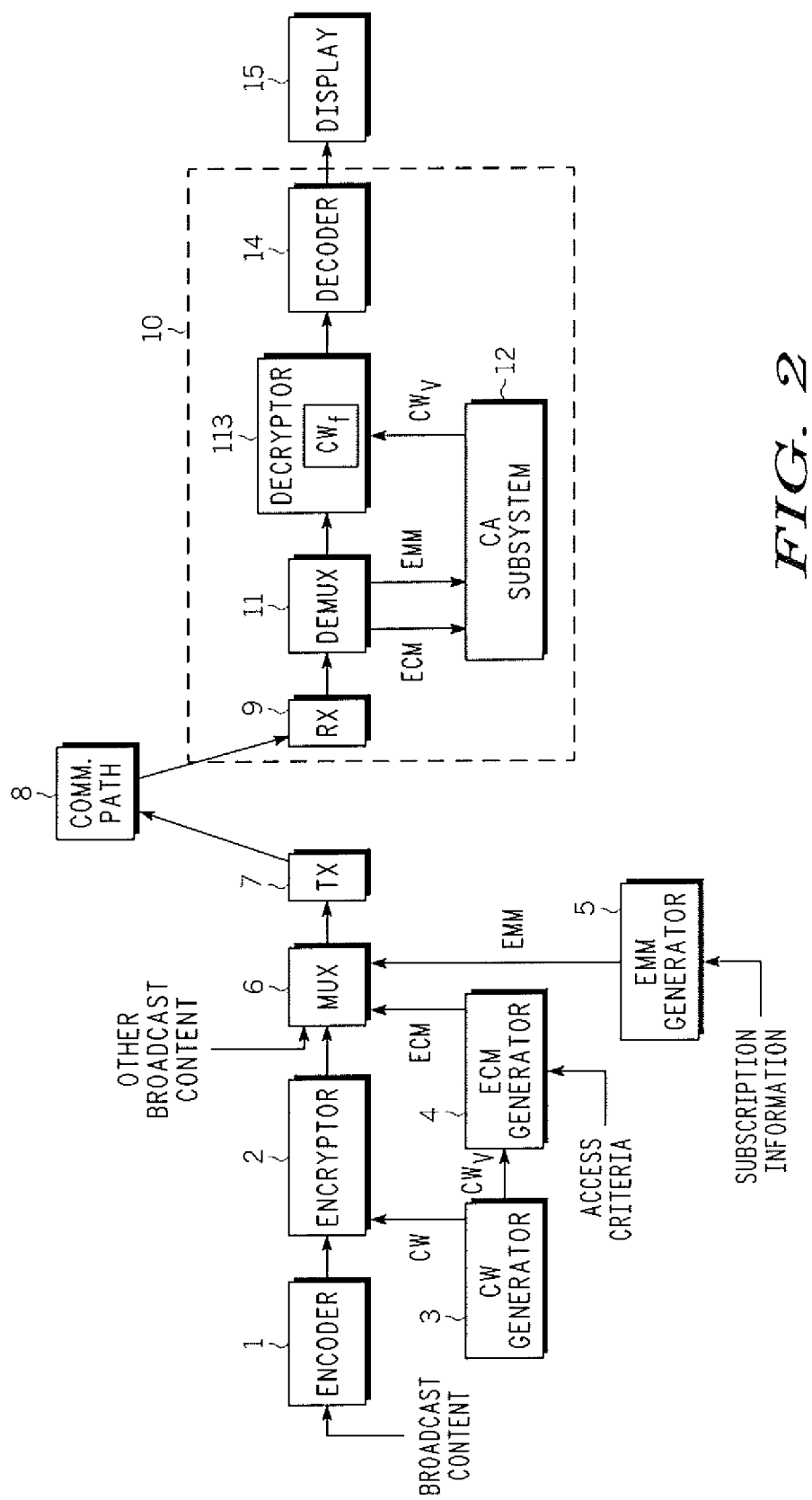
FIG. 2 is a system for securely distributing content to client device that has a constrained decryptor that only employs a limited number of the total set of available control words in accordance with an embodiment of the invention.

FIG. 2 is a system for securely distributing content in accordance with an embodiment of the invention which is similar to the system depicted in FIG. 1, except that in FIG. 2 the decryptor and hence the client device, is a constrained decryptor that only employs a limited number of the total set of control words that may be employed by the secure decryptors. In FIGS. 1 and 2 like elements are denoted by like reference numerals. In FIG. 2 the client device 10 includes a decryptor 113 that uses two control words. One control word is variable ($CW_v$) and is typically provided to the client device 10 by another device using, for example, ECM and EMM messages that delivered over a conduit such as communication path 8. In particular, in this example the CW generator 3 delivers the variable control word to the ECM generator 4 for delivery over the communication path 8 in an entitlement control message. Decryptor 113 also receives a fixed control word ($CW_f$). The fixed control word is locally accessible to the decryptor 113. That is, the fixed control is not received over the communication path 8. Moreover, the fixed control word will generally be stored in a manner that makes it substantially inaccessible to "hackers" by placing it in a secure, protected storage area of memory. One example of secure, protected storage is the on-chip PROM or FLASH memory of a microcontroller chip that can be programmed to make readout of data stored therein impossible except by internal access by the microcontroller itself. This type of secure storage capability exists in many modern microprocessors and microcontrollers as protection against unauthorized duplication of sensitive data or program information. Another example of secure, protected storage is PROM or FLASH memory external to a microprocessor chip but internal to the set-top box 104. Although not quite as secure as the internal protected memory of a microprocessor chip, such PROM and FLASH memory is sufficiently difficult for a subscriber or hacker to access that it provides a considerable barrier to accessing the contents thereof.

Decryptor 113 merges both control words $CW_v$ and $CW_f$ together to form the control word used by encryptor 2 before decrypting the content. In one implementation, the n-bit control word $CW_f$ is concatenated with the m-bit control word $CW_v$ to form the N-bit (where N=n+m) control word used to decrypt the content. In another implementation, $CW_V$ is received as an N-bit control word and decryptor 113 overwrites some of those N-bit control words with the n-bit control word $CW_f$. In either case, decryptor 113 employs a constrained control word of N bits in which n bits are fixed. For example, if a control word has 64 bits, a constrained word may have 8 of those bits fixed. That is, $CW_f$ employs 8 bits. The fixed bits may appear anywhere in the N bit control word. In this example there is only a 0.4% chance that an unconstrained control word will be generated that matches the constrained control word. Even if the control words were to match, the ability of unauthorized parties to decrypt content can be reduced if the unconstrained control word is rapidly changing, which is typically the case when a continuous stream of ECM messages is employed. Moreover, if the unconstrained control words are designed in such a way as to avoid the constrained control word space, the likelihood that the constrained and unconstrained control words will match can be reduced to zero.

Figure 3:
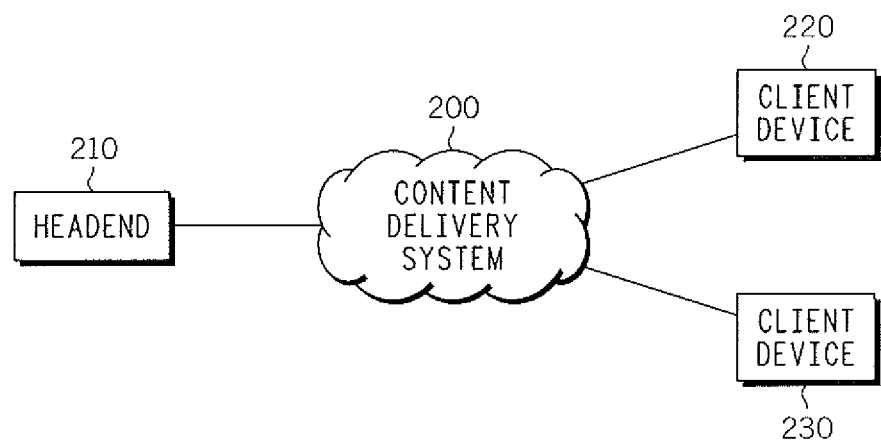
FIG. 3 shows a broadcast environment in which client devices that use a constrained control word decryptor co-exist with other client devices that use an unconstrained control word decryptor in accordance with an embodiment of the invention.

FIG. 3 shows a broadcast environment in which client devices that use a constrained control word decryptor co-exist with other client devices that use an unconstrained control word decryptor in accordance with an embodiment of the invention. As shown, a headend 210 delivers encrypted content to first and second client devices 220 and 230 over content delivery system 200, which corresponds to communications path 8 shown in FIGS. 1 and 2. The first client device 220 is representative of client devices that use constrained control words. The second client device 230 is representative of client devices that use unconstrained control words. The headend may deliver the control words using ECM and EMM messages as described above.

Illustrative examples of the content delivery system 200 include, but are not limited to, broadcast television networks, cable data networks, xDSL (e.g., ADSL, ADLS2, ADSL2+, VDSL, and VDSL2) systems, satellite television networks and packet-switched networks such as Ethernet networks, and Internet networks. In the case of a cable data network, an all-coaxial or a hybrid-fiber/coax (HFC) network may be employed. The all-coaxial or HFC network generally includes an edge QAM modulator and a hybrid fiber-coax (HFC) network, for example. The edge modulator receives Ethernet frames that encapsulate transport packets, de-capsulate these frames and removes network jitter, implements modulation and, performs frequency up-conversion and transmits radio frequency signals representative of the transport stream packets to end users over the HFC network. In the HFC network, the transport stream is distributed from the headend 210 (e.g., a central office) to a number of second level facilities (distribution hubs). Each hub in turn distributes carriers to a number of fiber nodes. In a typical arrangement, the distribution medium from the head-end down to the fiber node level is optical fibers. Subscriber homes are connected to fiber hubs via coaxial cables.

In the case of a packet-switched network, content delivery system 210 may employ any suitable network-level protocol. While the IP protocol suite is often used, other standard and/or proprietary communication protocols are suitable substitutes. For example, X.25, ARP, RIP, UPnP or other protocols may be appropriate in particular installations.

The second client device 230, which uses unconstrained control words, will generate the appropriate control word needed to decrypt the content when it receives the correct ECM and EMM messages from the headend. Thus, access to content can be controlled by the controlling the ECM and EMM messages. On the other hand, as noted above, it is unlikely that this control word will match the constrained control word used by the first client device 220. Thus, in all likelihood, the first client device 220 will not be able to decrypt content encrypted for the second client device. Accordingly, even if the constrained control word decryptor employed in the first client device 220 is less secure than the unconstrained control word decryptor employed in the second client device 230, the relaxed security of the constrained control word decryptor will not increase the vulnerability of the second client device 230 to attack by the first client device 220. Stated differently, even if some client devices have a higher level of security than other client devices, the client devices with the lower level of security will not jeopardize the security of the more secure client devices. Moreover, both sets of client devices may operate in the same broadcast environment, provided that the headend or other content source is aware of the different control words employed by the different sets of client devices.

Figure 4:
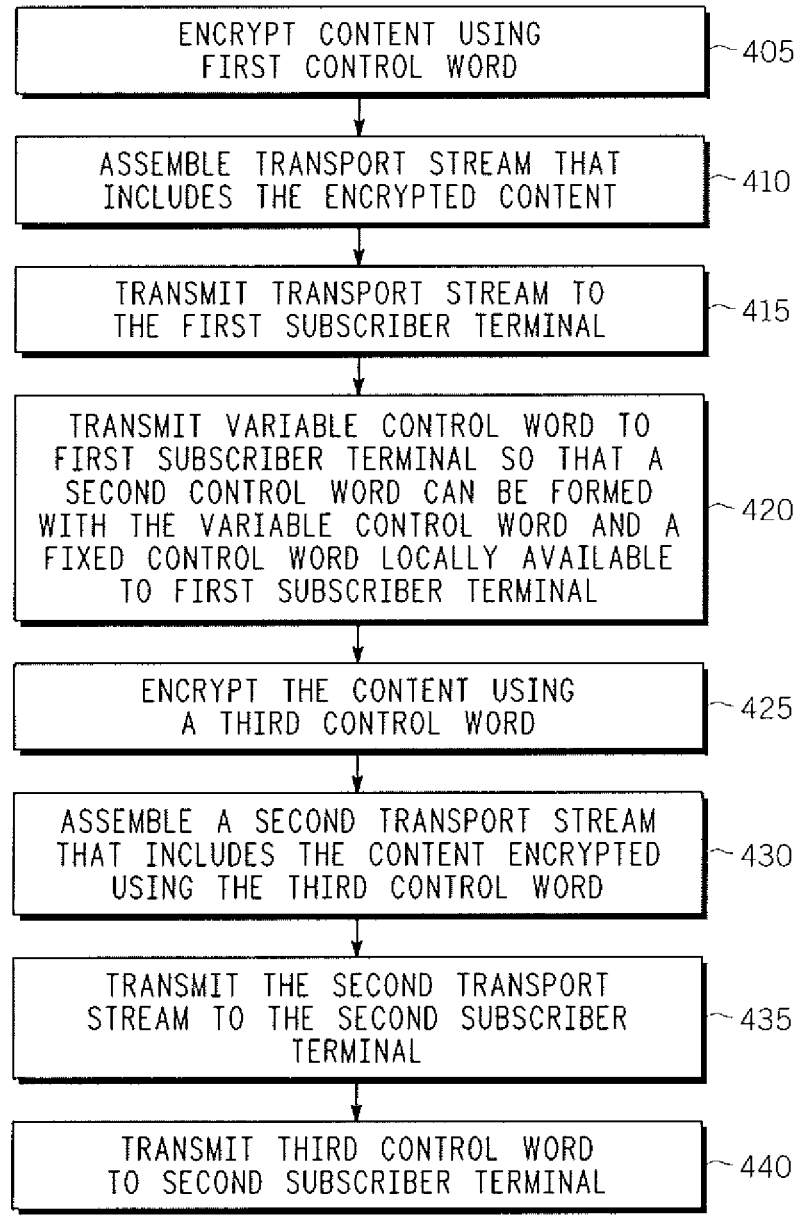
FIG. 4 is a flowchart showing one example of a method in accordance with an embodiment of the invention by which a headend delivers programming content to the first and second client devices which employ constrained and unconstrained control word decryptors, respectively.

FIG. 4 is a flowchart showing one example of a method in accordance with an embodiment of the invention by which the headend delivers programming content to the first and second client devices. The method begins in step 405 when the headend encrypts content using a first control word that serves as an encryption/decryption key. In step 410 a transport stream is assembled that includes the encrypted content. The transport stream is transmitted over the content delivery network to the first subscriber terminal in step 415. Next, in step 420, a variable control word is transmitted over the content delivery network to the first subscriber terminal. The first client device can form a second control word from a combination of the variable control word and a fixed control word associated with the first subscriber terminal. The second control word serves as a decryption key for decrypting the encrypted content received with the transport stream.

The method continues when the programming content is to be delivered to the second client device. In step 425 the content is encrypted using a third control word that serves as a second encryption/decryption key. The headend assembles a second transport stream in step 430 that includes the content encrypted using the third control word. The second transport stream is transmitted over the content delivery network to the second subscriber terminal in step 435. The third control word is transmitted to the second subscriber terminal in step 440.

In the examples presented above the first client device 220 uses constrained control words that are constrained by combining a locally accessible fixed control word with the variable control word that is received over the content delivery system 200. More generally, however, the first client device 220 may use a control word that is mathematically constrained in any desired manner, provided that the control word is constrained so that the potential number of control words that can be used by the first client device 220 as a decryption key is relatively small compared to the potential number of control words that can be used by the second client device 230 as a decryption key. The number of constrained control words relative to the number of unconstrained control words will be dictated by the degree of security that is required.

One way in which the first client device 220 may constrain the first control word is by applying an algorithm to the variable control word. The algorithm may be stored in the aforementioned secure memory so that it is not accessible to hackers. The algorithm may mathematically constrain the control word so that it is limited to a small subset of the unconstrained control words in any of a virtually unlimited number of different ways. For instance, as a simple illustrative example, the algorithm may limit the control words to words that are prime or words that are divisible a preselected integer. If a fixed control word is combined with the variable control word as described in the examples above, the algorithm may dictate precisely how the two words are to be combined.

The processes described above, including but not limited to those shown in FIG. 4, may be implemented in a general, multi-purpose or single purpose processor. Such a processor will execute instructions, either at the assembly, compiled or machine-level, to perform that process. Those instructions can be written by one of ordinary skill in the art following the description herein and stored or transmitted on a computer readable medium. The instructions may also be created using source code or any other known computer-aided design tool.

A computer readable medium may be any medium capable of carrying those instructions and include a CD-ROM, DVD, magnetic or other optical disc, tape, and silicon memory (e.g., removable, non-removable, volatile or non-volatile).

Although various embodiments are specifically illustrated and described herein, it will be appreciated that modifications and variations of the present invention are covered by the above teachings and are within the purview of the appended claims without departing from the spirit and intended scope of the invention. For example, while the invention has been described in the context of a conditional access system, which protects content by requiring certain criteria to be met before granting access to content, the invention is also applicable to copy protection schemes, which prevents the unauthorized reproduction of content.

The invention claimed is:

1. A method for decrypting an encrypted transport stream, comprising:
   receiving the encrypted transport stream over a content delivery network, wherein the encrypted transport stream was encrypted using a first control word that serves as an encryption/decryption key;
   receiving a variable control word over the content delivery network;
   receiving a multiple bit fixed control word over a communication path that is different than the content delivery network; and
   processing the variable control word with the multiple bit fixed control word to create a mathematically constrained second control word, wherein a first plurality of bits of the second control word are equal to corresponding bits of the variable control word, and a second plurality of bits of the second control word are formed using bits of the fixed control word, and wherein the created second control word is mathematically constrained with respect to the variable control word; and
   decrypting the encrypted transport stream using the second control word if the second control word is the same as the first control word.

2. The method of claim 1 wherein processing the variable control word includes processing the variable control word to create the mathematically constrained second control word in accordance with an algorithm accessed from a secure memory associated with a decryptor that decrypts the encrypted transport stream.

3. The method of claim 1 wherein processing the variable control word to create the mathematically constrained second control word comprises concatenating the variable control word and the fixed control word.

4. The method of claim 1 wherein the fixed control word is an n bit control word, wherein n≥1, and processing the variable control word to create the mathematically constrained second control word comprises overwriting n of the bits in the variable control word with the n bit control word.

5. The method of claim 1 wherein receiving the fixed control word includes accessing the fixed control word from a secure memory associated with a decryptor that decrypts the encrypted transport stream.

6. The method of claim 5 wherein the fixed control word is hardwired in the secure memory.

7. The method of claim 1 wherein the encryption/decryption key is encapsulated in an entitlement control message (ECM).

8. The method of claim 7 wherein the ECM is included with the encrypted transport stream.

9. The method of claim 7 wherein the encrypted transport stream further comprises entitlement management message (EMM) packets associated with a subscriber that receives the encrypted transport stream.

10. A client device, comprising:
    a receiver for receiving and demodulating an encrypted transport stream over a content distribution network, wherein the encrypted transport stream was encrypted using a first control word that serves as an encryption/decryption key, wherein the receiver is configured to receive a variable control word over the content delivery network; and
    a decryptor coupled to the receiver and configured to receive a multiple bit fixed control word over a communication path that is different than the content delivery network, the decryptor for decrypting the encrypted transport stream using a mathematically constrained second control word that is mathematically constrained with respect to the variable control word, wherein the decryptor is configured to derive the mathematically constrained second control word in part using an algorithm that is locally accessible to the decryptor, wherein the algorithm forms the mathematically constrained second control word by using the variable control word, wherein a first plurality of bits of the second control word are equal to corresponding bits of the variable control word, and a second plurality of bits of the second control word are formed using bits of the fixed control word; and
    a decoder for decoding the decrypted transport stream.

11. The client device of claim 10 wherein the fixed control word is stored locally to the decryptor and the algorithm forms the second control word from the variable control word and the fixed control word that is locally accessible to the decryptor.

12. The client device of claim 11 wherein the algorithm forms the second control word by concatenating the variable control word and the fixed control word.

13. The client device of claim 11 wherein the fixed control word is an n bit control word, wherein n≥1, and the algorithm forms the second control word by overwriting n of the bits in the variable control word with the n bit control word.

14. The client device of claim 11 further comprising a locally accessible secure memory associated with the decryptor in which the fixed control word is stored.

15. The client device of claim 10 wherein the variable control word is encapsulated in an entitlement control message (ECM).

16. The client device of claim 15 wherein the receiver receives the ECM in the encrypted transport stream.

17. The client device of claim 16 wherein the encrypted transport stream includes entitlement management message (EMM) packets associated with a subscriber that receives the encrypted transport stream.

18. At least one non-transitory computer-readable medium encoded with instructions which, when executed by a processor, performs a method including:
    encrypting content using a first control word that serves as an encryption/decryption key;
    assembling a transport stream that includes the encrypted content
    transmitting the transport stream over a content delivery network to a first subscriber terminal; and
    transmitting a variable control word over the content delivery network to the first subscriber terminal such that the first subscriber terminal uses the variable control word to create a mathematically constrained second control word that is mathematically constrained with respect to the variable control word, wherein a first plurality of bits of the second control word are equal to corresponding bits of the variable control word, and a second plurality of bits of the second control word are formed using a multiple bit fixed control word received over a communication path that is different than the content delivery network, and wherein the mathematically constrained second word serves as a decryption key for decrypting the encrypted content received with the transport stream.

19. The computer-readable medium of claim 18 further comprising:
   encrypting the content using a third control word that serves as a second encryption/decryption key;
   assembling a second transport stream that includes the content encrypted using the third control word;
   transmitting the second transport stream over the content delivery network to a second subscriber terminal; and
   transmitting the third control word to the second subscriber terminal.

20. The computer-readable medium of claim 19 wherein the first subscriber terminal belongs to a first class of subscriber terminals that maintain a lower level of security than a second class of subscriber terminals to which the second subscriber terminal belongs.

21. The computer-readable medium of claim 19 further comprising selecting the variable control word such that no resulting value for the decryption key is equal to the third control word.

* * * * *